Aug. 23, 1938.  C. H. HAVILL  2,127,996
COUPLING MECHANISM
Filed March 19, 1937
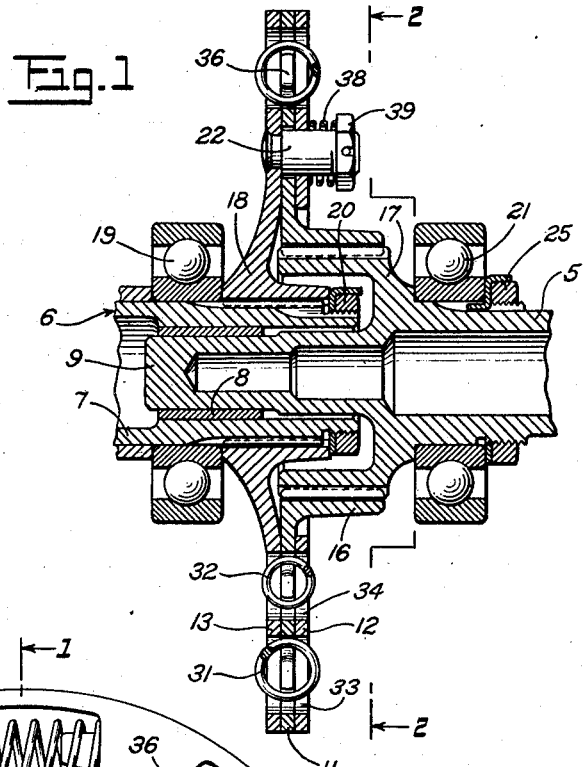
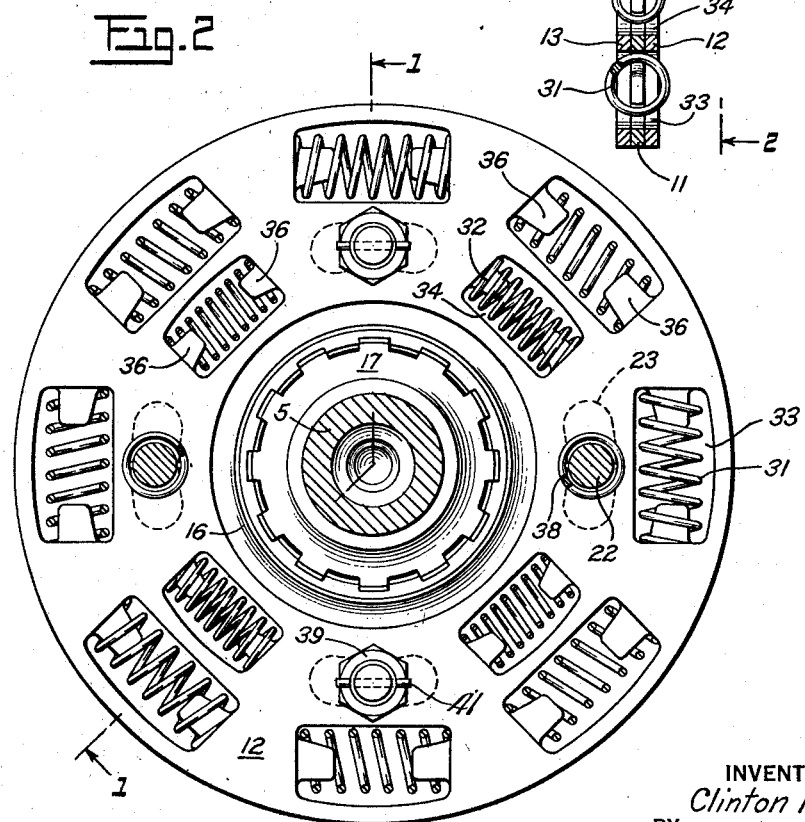
INVENTOR.
Clinton H. Havill
BY Martin J. Finnegan
ATTORNEY.

Patented Aug. 23, 1938

2,127,996

UNITED STATES PATENT OFFICE 2,127,996

COUPLING MECHANISM

Clinton H. Havill, South Orange, N. J., assignor to Eclipse Aviation Corporation, East Orange, N. J., a corporation of New Jersey Application March 19, 1937, Serial No. 131,913

4 Claims. (Cl. 64—27)

This invention relates to couplings, and particularly to couplings of the class adapted to form a shock reducing connection between driving and driven elements.

The object of the invention is to provide an improved coupling mechanism of the character indicated, the improvements being in those features of construction and mode of operation which are pointed out in the following detailed description of the embodiment of the invention which is illustrated in the accompanying drawing.

It is to be expressly understood, however, that the drawing is for the purpose of illustration only, and is not designed as a definition of the limits of the invention, reference being had to the appended claims for this purpose.

In the drawing,

Fig. 1 is a longitudinal sectional view; and

Fig. 2 is a transverse sectional view taken along the line 2—2 of Fig. 1.

The coupling is illustrated as interposed between a driving shaft 5 and a second shaft 6 to be driven, the latter having a hollow end portion 7 receiving a sleeve bearing 8 within which the reduced end portion 9 of shaft 5 is rotatable with respect to the shaft 6 to which it transmits torque by way of intermediate connecting plates 11, 12, and 13.

The center plate 11 is shown as having a hub portion 16 splined to a correspondingly formed flange or rim 17 extending from the driving shaft 5. Thus plate 11 acts as the driving plate with respect to the two outer plates 12 and 13, the latter having a hub portion 18 splined to the shaft 6 and adjustably held against axial displacement by the combined action of bearing 19 and lock nut 20, there being similar holding means at 21 and 25 for shaft 5. Dowel pins 22 hold plates 12 and 13 for unitary movement, and pass through slots 23 in the driving plate 11, the said slots being of slightly greater width and considerably greater length than the diameter of the pins 22, whereby limited rotation of plate 11 in relation to the plates 12 and 13 is made possible, whenever flexibility in the drive is desirable, as upon starting, or upon sudden or impulsive torque increments or decrements.

In order to reduce the shock on such occasions as those just referred to, coiled springs 31 and 32 are placed in recesses 33 and 34, respectively, which are cut at equally spaced intervals in each of the plates 11, 12 and 13, the springs being of such diameters as to be engageable with the edges of all said recesses, and held in assembled relation thereto by the knobs 36 which project from the edges of the center plate 11 to enter the end turns of each spring coil.

As a means of supplementing the action of springs 31 and 32 in yieldably transmitting the torque, and in order to supply controllable lateral pressure, for regulable torque transmitting capacity along the engaged friction surfaces of the plates, each dowel pin receives a coiled spring 38 the compression of which is adjustably held by the setting of nuts 39 on the threaded ends of the pins, the nuts being held by suitable locking wires or pins 41 whereby the springs 38 will act upon plates 11, 12 and 13 to damp out oscillatory as well as axially directed vibrations of the driving and driven parts. It will be observed that the springs 31 are of a different capacity from that of the springs 32 and hence of a different degree of responsiveness to the applied forces, the purpose of this being to increase the range of shock absorbing power so that each set of springs will be capable of handling a different order of vibratory frequencies, corresponding to the variations in the periodicity of the torque impulses to which the drive may be subjected. Thus the two different concentrically disposed sets of springs tend to have alternating periods of maximum effectiveness as vibration damping instrumentalities, whenever the torque transmission fluctuates between impulses of one range of vibrational frequencies (at which the springs 31 for example, will be most effective) and those of a different range of frequencies (at which the springs 32 will be most effective).

What I claim is:—

1. In a coupling, in combination, a driving plate having plural groups of spaced arcuate slots therein, driven plates on each side of said driving plate, each of said driven plates having arcuate slots registrable with one group of the arcuate slots in said driving plate, means extending through a second group of the arcuate slots in said driving plate to lock the driven plates to one another, for unitary rotation, resilient means mounted on said locking means to exert pressure laterally of said plates and thereby set up regulable torque transmitting capacity due to the friction of the contacting surfaces thereof and additional resilient means mounted in said first-named group of arcuate slots to transmit torque from said driving plate to said driven plates in an amount in excess of that due to the friction of the contacting plate surfaces.

2. In a coupling, in combination, a driving plate having plural groups of spaced arcuate slots therein, a driven plate having arcuate slots registrable with each of the arcuate slots in said driving plate, resilient means disposed in one group of said slots to damp the vibrations produced by torque impulses of relatively high frequency, and resilient means of a different characteristic disposed within a second group of said slots to damp the vibrations produced by torque impulses of relatively lower frequency.

3. In a coupling, in combination, a driving plate having plural groups of spaced recesses therein, a driven plate having recesses spaced correspondingly to the recesses in said driving plate, resilient means disposed in one group of said recesses to damp the vibrations produced by torque impulses of relatively high frequency, and resilient means of a different characteristic disposed within a second group of said recesses to damp the vibrations produced by torque impulses of relatively lower frequency.

4. In a coupling, in combination, a driving plate having plural groups of spaced arcuate slots therein, driven plates on each side of said driving plate, each of said driven plates having arcuate slots registrable with one group of the arcuate slots in said driving plate, means extending through a second group of the arcuate slots in said driving plate to lock the driven plates to one another, for unitary rotation, resilient means to exert pressure laterally of said plates and thereby set up regulable torque transmitting capacity due to the friction of the contacting surfaces thereof and additional resilient means mounted in said first-named group of arcuate slots to transmit torque from said driving plate to said driven plates in an amount additional to that due to the friction of the contacting plate surfaces.

CLINTON H. HAVILL.